United States Patent
Perry

(10) Patent No.: US 10,653,137 B2
(45) Date of Patent: May 19, 2020

(54) ARTHROPOD PEST CONTROL COMPOSITION AND METHOD

(71) Applicant: Stephen C. Perry, Norwood, MA (US)

(72) Inventor: Stephen C. Perry, Norwood, MA (US)

(*) Notice: Subject to any disclaimer, the term of this patent is extended or adjusted under 35 U.S.C. 154(b) by 427 days.

(21) Appl. No.: 13/858,281

(22) Filed: Apr. 8, 2013

(65) Prior Publication Data

US 2014/0303262 A1  Oct. 9, 2014

(51) Int. Cl.
*A01N 25/02* (2006.01)
*A01N 31/02* (2006.01)

(52) U.S. Cl.
CPC .................................. *A01N 31/02* (2013.01)

(58) Field of Classification Search
CPC ......... A01N 31/02; A01N 25/02; A01N 25/30
See application file for complete search history.

(56) References Cited

U.S. PATENT DOCUMENTS

| | | | | |
|---|---|---|---|---|
| 4,443,362 A * | 4/1984 | Guth | ...................... | A61K 8/39 424/70.21 |
| 6,001,874 A * | 12/1999 | Veierov | .................. | A01N 65/00 424/727 |
| 2006/0020045 A1 * | 1/2006 | Berlin | .................. | A61K 9/2054 514/724 |
| 2007/0020304 A1 * | 1/2007 | Tamarkin | ............... | A01N 25/16 424/405 |
| 2009/0253603 A1 * | 10/2009 | Uchiyama | ................ | A61K 8/33 510/159 |
| 2009/0317433 A1 * | 12/2009 | Finch | ..................... | A01N 47/34 424/405 |

OTHER PUBLICATIONS

National Center for Biotechnology Information. PubChem Compound Database; CID=8174, https://pubchem.ncbi.nlm.nih.gov/compund/8174 (accessed Jul. 6, 2016).*

* cited by examiner

*Primary Examiner* — Sarah Pihonak
*Assistant Examiner* — Jason Deck
(74) *Attorney, Agent, or Firm* — Johnson & Martin, P.A.; James David Johnson

(57) ABSTRACT

A composition to affect an arthropod is described that may include a fatty alcohol, a surface active agent, and a carrier. The composition may include substantially no oil and interrupts production of adipokinetic hormones (AKH) in the arthropod. The composition is introducible to the arthropod via contact or via a liquid application such as a spray. A method of using the composition is described that may include introducing the composition to an environment, causing the arthropod be introduced to the composition, and affecting production of peptides in the arthropod via the composition that affect energy regulation of the arthropod.

3 Claims, No Drawings

ARTHROPOD PEST CONTROL COMPOSITION AND METHOD

FIELD OF THE INVENTION

The invention relates to controlling a pest. More particularly, the invention relates to controlling an arthropod pest using a composition.

BACKGROUND

Present commercialization of pesticides generally operates by producing synthesized endocrine disrupters. These insect growth regulators (IGRs) represent a group of insecticides, often referred to as third-generation insecticides, which were developed to interfere with the growth process of insects. IGRs include different classes of chemicals with specific modes of action, particularly ecdysteroid agonists and juvenile hormone analogs. The IGRs in the current state of the art induce symptoms of hyperecdysonism in the target insect. Treated insects show precocious lethal molting, abnormal intermediates (e.g., nymphal-adult and pupal-adult) and effects on reproduction (oviposition and fertility).

However, selectivity of IGR solutions to a particular species or narrow range of species often renders such a solution not economically viable for manufacturers to develop. Additionally, many IGRs suffer from an absence of the effect and rapid degradation in vivo. Moreover, IGRs are typically only effective at special stages, such before the target insect molts. Furthermore, belated mortality of the target insect causes a psychological disadvantage to consumers, causing a purchaser of the IGR-based solution to doubt effectiveness after application.

What is needed is a composition or compositions to control arthropod populations that do not suffer from the disadvantages of IGRs. What is also needed is a composition or compositions to control arthropod populations without belated mortality. What is needed further is a composition or compositions to control arthropod populations while using substantially no essential oils. A need also exists for a method or methods for applying the above necessary composition to control arthropod populations.

SUMMARY

According to embodiments of the present invention, an arthropod pest control composition is described to control arthropod populations that do not suffer from the disadvantages of IGRs. According to embodiments of the present invention, a composition is described control arthropod populations without belated mortality. Additionally, according to embodiments of the present invention, a composition is described to control arthropod populations using substantially no essential oils. Furthermore, according to an embodiment of the present invention, a method is described for applying the above necessary composition.

According to an embodiment of the present invention, in one aspect, a composition to affect an arthropod is described which may include a fatty alcohol, a surface active agent, and a carrier. The composition may include substantially no oil. The composition may interrupt production of adipokinetic hormones (AKH) in the arthropod.

In another aspect, the composition is derivable from food stuffs.

In another aspect, the surface active agent may be amphiphilic.

In another aspect, the carrier may be a solvent.

In another aspect, production of the AKH may be affected by interrupting peptides that produce the AKH.

In another aspect, the peptides affected may include metabolic neuropeptides that affect energy regulation in the arthropod via at least the AKH. The composition may affect a nervous system of the arthropod to interrupt the peptides.

In another aspect, the composition is introducible to the arthropod via at least contact with a droplet of the composition or ingestion of the droplet, the droplet being formable via a liquid application of the composition to a surface or substrate.

According to an embodiment of the present invention, in one aspect, a composition is described to affect an arthropod which may include a fatty alcohol, a surface active agent that is amphiphilic, and a solvent carrier. The composition may interrupt production of peptides in the arthropod that affect energy regulation of the arthropod.

In another aspect, the composition is derivable from food stuffs.

In another aspect, the composition may include substantially no oil.

In another aspect, the peptides may regulate production of adipokinetic hormones (AKH). The production of the AKH may be affected by interrupting the peptides.

In another aspect, the peptides may be metabolic neuropeptides.

In another aspect, the composition is introducible to the arthropod via at least contact with a droplet of the composition or ingestion of the droplet, the droplet being formable via a liquid application of the composition to a surface or substrate.

A method aspect is described for using a composition to affect an arthropod which may include the steps of: (a) introducing the composition that may include a fatty alcohol, a surface agent, and a carrier to an environment, (b) causing the arthropod located approximately in the environment to be introduced to the composition, and (c) affecting production of peptides in the arthropod via the composition that affect energy regulation of the arthropod. The composition may include substantially no oil.

In another aspect of the method, the composition is derivable from food stuffs.

In another aspect of the method, the peptides may regulate production of adipokinetic hormones (AKH).

In another aspect of the method, step (a) may further include introducing a liquid application of the composition having droplets into the environment; and step (b) may further include introducing the composition to the arthropod via at least contact with the droplet or ingestion of the droplet.

In another aspect of the method, the surface active agent may be amphiphilic.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

The present invention is best understood by reference to the detailed drawings and description set forth herein.

Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

The present invention will now be described in detail with reference to embodiments thereof as illustrated in the accompanying drawings. In the following description, an arthropod pest control composition and method will be discussed. Those of skill in the art will appreciate alternative labeling of the arthropod pest control composition and method as composition, control composition, insect control composition, arthropod control composition, method, the invention, or other similar names. Skilled readers should not view the inclusion of any alternative labels as limiting in any way.

The composition will now be discussed generally. The invention relates to a composition that may control an arthropod or population of arthropods by affecting peptides within the arthropod that produce metabolism regulating hormones, such as adipokinetic hormones (AKH). The composition can be useful for affecting most land-dwelling arthropod species and controlling their populations, and particularly, species that are members of the Insecta (e.g., bed bugs and roaches) and Arachnida (e.g., spiders) classes and the Myriapoda subphylum (e.g., millipedes and centipedes). While the compositions and methods described herein can be useful for affecting and controlling the populations of most land-dwelling arthropod species, in exemplary embodiments, the compositions and methods described herein can be used in connection with affecting and controlling the populations of various insect species. Therefore, the term "insect" may be used herein for convenience but shall not be construed as limiting the use of the compositions and methods of this invention in connection with the aforementioned uses and purposes with other arthropod species. The composition affects the peptides by leveraging an insect's own need for lipids, using the need to drive ingestion and processing of the compounds used to affect or destroy AKH producing peptides.

Recent advances in genomic and post-genomic technologies have facilitated a genome-wide analysis of the insecticide resistance-associated genes in insects. Through bed bug, Cimex lectularius transcriptome analysis, 14 molecular markers were identified to be associated with pyrethroid resistance. During development of the invention described by this disclosure, studies revealed that most of the resistance-associated genes functioning in diverse mechanisms are expressed in the epidermal layer of the integument, which could prevent or slow down the toxin from reaching the target sites on nerve cells, where an additional layer of resistance (kdr) is possible. This strategy evolved in bed bugs is based on their unique morphological, physiological and behavioral characteristics and has not been reported in any other insect species. RNA interference-aided knockdown of resistance associated genes showed the relative contribution of each mechanism towards overall resistance development. Understanding the complexity of adaptive strategies employed by bed bugs advantageously aided design of a new and novel composition to help in developing highly effective and sustainable bed bug control compositions and methods discussed throughout this disclosure.

The composition may include a fatty alcohol, a surface active agent, and a carrier. The carrier may be a solvent. The composition may be advantageously produced substantially without using essential oils, such as plant oils. Additionally, the composition may be created using food stuffs and may have a relatively low impact on the environment.

The fatty alcohol will now be discussed in more detail. A fatty alcohol is typically a high-molecular-weight, straight-chain of primary alcohols. Fatty alcohols typically have an even number of carbon atoms and a single alcohol group. The composition may include fatty alcohols such as, but not limited to, capryl alcohol, 2-ethryl hexanol, pelargonic alcohol, capric alcohol, undecyl alcohol, lauryl alcohol, tridecyl alcohol, myristyl alcohol, pentadecyl alcohol cetyl alcohol, palmitoleyl alcohol, heptadecyl alcohol, steryl alcohol, elaidyl alcohol, oleyl alcohol, linoleyl alcohol, elaidolinoleyl alcohol, linolenyl alcohol, elaidolinolenyl alcohol, ricinoleyl alcohol, nonadecyl alcohol, arachidyl alcohol, heneicosyl alcohol, behenyl alcohol, erucyl alcohol, lignoceryl alcohol, ceryl alcohol, montanyl alcohol, 1-nonacosanol, myricyl alcohol, melissyl alcohol, 1-dotriacontanol, geddyl alcohol, and/or cetearyl alcohol.

The surface active agent will now be discussed in greater detail. The surface active agent may facilitate interaction of the composition with the surface of a lipid. In an embodiment, the surface active agent may interact with a phospho-lipid of an arthropod. The surface active agent may be amphiphilic (amphipathic), or possessing both hydrophilic and lipophilic properties. Due to its amphiphilic properties, the surface active agent may allow the composition to interact with other lipids via lipid polymorphism and be transported throughout the arthropod via the natural processes of the organism. The surface active agent may interact with lipids. Lipids that can be used may include, but are not limited to, decanoic acid, monoester with 1,2,3-propanetriol; diglyceryl monooleate; dilaurin; dipalmitin; dodecanoic acid, monoester with 1,2,3-propanetriol; (+)-ethyl lactate; ethyl lactate; glycerin; glycerol monooleate; glyceryl dicaprylate; glyceryl dimyristate; glyceryl dioleate; glyceryl distearate; glyceryl monomyristate; glyceryl monooctanoate; glyceryl monooleate; glyceryl monostearate; glyceryl stearate; polyglyceryl oleate; polyglyceryl stearate; 9-octadecenoic acid (9Z)-, potassium salt; potassium ricinoleate; potassium stearate; soap; sodium oleate; sodium ricinoleate; sodium stearate; soya lecithins; and/or tetraglyceryl monooleate.

Once the composition has been carried to the nervous system of the arthropod, it may affect one or more peptides to inhibit production of metabolism regulating hormones. The peptides may be metabolic neuropeptides, and may regulate hormones such as adipokinetic hormone (AKH). The composition may work against the nervous system of the arthropod as a voltage-dependent sodium-channel agonist, causing repetitive firing of neurons. After being exposed to the composition, production of the metabolism regulating hormones such as AKH in the arthropod may be disrupted. This interference of hormone production may cause the arthropod to experience symptoms of hyperexcitation, tremors, and convulsions, followed by lethargy and paralysis, typically followed by mortality of the arthropod.

AKH and its production by arthropods are generally known in the art. In the interest of clarity, AKH and production of the same are now briefly discussed. AKH is a metabolic neuropeptide that mediates mobilization of energy substrates from the fat body in many arthropods. AKH can induce both hypertrehalosemia and hyperlipemia in insects and other arthropods. AKH can cause prolonged hyperactivity, which facilitates rapid consumption of energy resources in an organism, which may lead to premature, starvation-derived death.

The composition may be introduced to the arthropod by various delivery techniques, for example, via contact or consumption. Contact with the arthropod may be accomplished by direct contact of the composition with a part of the arthropod. For example, the composition may be applied to an environment via a liquid application of the composition such as, for example, a spray, a fog, a haze, an electrostatic spray, a roll-on application, a brush-on application, a towel-applied application, or any other suitable application of the composition in liquid form to a surface or substrate. In exemplary embodiments of the compositions and methods described herein, however, the composition may be applied as a liquid to a surface or substrate via a spray. The spray may include droplets of the composition, some of which may directly contact an arthropod and introduce the composition. Alternatively, the composition may be introduced to the arthropod via ingestion. For example, after spraying the composition in an environment, an arthropod may ingest a material having a droplet of the composition or a residue from a droplet.

Alternatively, in an embodiment of the invention, the composition may be introduced to the arthropod in a powdered or otherwise solid form. As an example, the powdered form may be created via freeze-drying the liquid composition to a dry state. Skilled artisans will appreciate that freeze-drying, also known as lyophilization, lyophilization, or cryodesiccation, may be used to preserve perishable materials through dehydration as moisture is sublimed from the material. The composition may then be applied in powder form, whereby it may act as a humectant and draw moisture from surrounding air. As the powdered composition receives moisture, it may release or otherwise produce liquid over a duration of time, which may control the timing for release of the composition. In some embodiments, introducing the composition in powdered may provide a mechanism for slow release of the composition to an arthropod or into an environment.

A method for using the above disclosed composition to affect an arthropod will now be discussed. The method may include introducing the composition into an environment, for example, as droplets from a spray. The method may also include causing the arthropod located in the environment to be introduced to the composition. As discussed above, an arthropod may be introduced to the composition via contact, ingestion, or other introduction techniques. The method may additionally include affecting production of peptides in the arthropod that relate o energy regulation. The metabolic process of the arthropod may be affected by interfering with the production of the peptides and/or hormones produced by the peptides. Alternatively, the peptides that produce metabolic hormones may be at least partially destroyed by the composition.

In an embodiment of the composition, the fatty alcohols may be derived from palm, coconut, apples, and/or bananas. In this embodiment, the fatty alcohols may be capric, undecyl, and lauryl. Water may be used as a carrier. Preferred embodiments of the invention will now be discussed without limitation. Skilled artisans will appreciate the inclusion of preferred embodiments to enhance the clarity of the disclosure, and not to limit the invention to any particular embodiment. In a preferred embodiment, the composition may have a ratio of 4:3:2 by molecular weight, totaling 2-16% by weight in a carrier. In a more preferred embodiment, the composition may have a ratio of 3:2:2 by molecular weight, totaling 3-12% by weight in a carrier. In a most preferred embodiment, the composition may have a ratio of 2:2:1 by molecular weight, totaling 5-10% by weight in a carrier. Those of skill in the art will appreciate additional embodiments totaling 0.5, 1, 1.5, 2, 3, 4, 5, 6, 7, 8, 9, 10, 11, 12, 13, 14, 15, 16, 17, 18, 19, 20, 21, 22, 23, 24, or 25% by weight in a carrier.

Trials of the composition will now be discussed according to an embodiment of the present invention. The trials were performed by applying the above described composition to three treated groups of ten arthropods, after which knockdown and mortality rates were measured. The Jersey City bed bug (Cimex lectularius) was used as the arthropod in the trials. As a control, three groups of ten arthropods from the same species were treated with tap water in the same manner.

For the first treated group, 1.15 g of the composition was sprayed in an environment with ten subject arthropods. One half minute after spraying, knockdown rate of the arthropods was 0/10. One minute after spraying, knockdown rate of the arthropods was 4/10. Two minutes after spraying, knockdown rate of the arthropods was 9/10. Three minutes after spraying, knockdown rate of the arthropods was 10/10. The 24-hour mortality rate of the arthropods in the first treated group was 10/10.

For the second treated group, 0.93 g of the composition was sprayed in an environment with ten subject arthropods. One half minute after spraying, knockdown rate of the arthropods was 3/10. One minute after spraying, knockdown rate of the arthropods was 7/10. Two minutes after spraying, knockdown rate of the arthropods was 10/10. The 24-hour mortality rate of the arthropods in the second treated group was 10/10.

For the third treated group, 1.06 g of the composition was sprayed in an environment with ten subject arthropods. One half minute after spraying, knockdown rate of the arthropods was 3/10. One minute after spraying, knockdown rate of the arthropods was 4/10. Two minutes after spraying, knockdown rate of the arthropods was 8/10. Three minutes after spraying, knockdown rate of the arthropods was 9/10. Four minutes after spraying, knockdown rate of the arthropods was 10/10. The 24-hour mortality rate of the arthropods in the third treated group was 10/10.

For the first untreated group, 1.05 g of tap water was sprayed in an environment with ten subject arthropods. Up to and including the three minutes after spraying, knockdown rate of the arthropods was 0/10. For measurements taken at four, five, and fifteen minutes after spraying, knockdown rate of the arthropods was 1/10. The 24-hour mortality rate of the arthropods in the first untreated group was 0/10, and 0/10 of the arthropods were moribund.

For the second untreated group, 1.08 g of tap water was sprayed in an environment with ten subject arthropods. For the duration of measurements, including measurements taken at four, five, and fifteen minutes after spraying, knockdown rate of the arthropods was 0/10. The 24-hour mortality rate of the arthropods in the second untreated group was 0/10, and 0/10 of the arthropods were moribund.

For the third untreated group, 1.14 g of tap water was sprayed in an environment with ten subject arthropods. Up to and including the three minutes after spraying, knockdown rate of the arthropods was 0/10. For measurements taken at four, five, and fifteen minutes after spraying, knockdown rate of the arthropods was 1/10. The 24-hour mortality rate of the arthropods in the third untreated group was 0/10, and 0/10 of the arthropods were moribund.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A liquid composition that is applicable in liquid form to a surface to kill an arthropod, the liquid composition consisting of:

a fatty alcohol consisting of geddyl alcohol;

a second fatty alcohol consisting of capric alcohol, undecyl alcohol, or both;

a surface active agent; and a carrier;

wherein the composition interrupts production of adipokinetic hormones (AKH) in the arthropod.

2. A solid composition that is applicable in solid form to a surface to kill an arthropod, the solid composition consisting of:

a fatty alcohol consisting of geddyl alcohol;

a second fatty alcohol consisting of myricil alcohol, capryl alcohol, pelargonic alcohol, or a combination of two or more of the foregoing;

a surface active agent that is amphiphilic; and a solvent carrier;

wherein the composition interrupts production of peptides in the arthropod that affect energy regulation of the arthropod.

3. A composition that is applicable to a surface to kill an arthropod, the composition consisting of:
a fatty alcohol consisting of geddyl alcohol;
a second fatty alcohol consisting of capric alcohol, undecyl alcohol, or both;
a surface active agent; and
a carrier;
wherein the composition interrupts production of adipokinetic hormones (AKH) in the arthropod.

* * * * *